United States Patent
Huang

(10) Patent No.: US 7,675,193 B2
(45) Date of Patent: Mar. 9, 2010

(54) SELECTIVE INDEPENDENT OVERLOAD AND GROUP OVERLOAD PROTECTION CIRCUIT OF POWER SUPPLY

(75) Inventor: Hsin-Sheng Huang, Kaohsiung (TW)

(73) Assignee: Silverstone Technology Co., Ltd., Taipei County (TW)

( * ) Notice: Subject to any disclaimer, the term of this patent is extended or adjusted under 35 U.S.C. 154(b) by 229 days.

(21) Appl. No.: 11/822,768

(22) Filed: Jul. 10, 2007

(65) Prior Publication Data

US 2009/0015064 A1    Jan. 15, 2009

(51) Int. Cl.
*H02J 1/10* (2006.01)
*H02H 3/20* (2006.01)

(52) U.S. Cl. .......................... 307/24; 361/91.1
(58) Field of Classification Search .................. 307/43, 307/11, 24, 28; 361/91.1
See application file for complete search history.

(56) References Cited

U.S. PATENT DOCUMENTS

| 2003/0057778 A1* | 3/2003 | Ai ................................. 307/64 |
| 2004/0119339 A1* | 6/2004 | Sytwu ........................... 307/28 |
| 2009/0021880 A1* | 1/2009 | Flay et al. .................... 361/101 |

* cited by examiner

*Primary Examiner*—Albert W Paladini
*Assistant Examiner*—Michael Rutland Wallis
(74) *Attorney, Agent, or Firm*—Muncy, Geissler, Olds & Lowe, PLLC

(57) ABSTRACT

The present invention discloses a selective independent overload and group overload protection circuit of a power supply. In the power supply, each of a plurality of loads that require a larger power output has an independent overload protection circuit, and the load is connected to a group overload protection circuit, such that a user can select to turn on the independent overload protection circuit or a group overload protection circuit that allows a larger power output and facilitates the user to select an appropriate power output according to the capacity requirement of the load.

6 Claims, 1 Drawing Sheet

SELECTIVE INDEPENDENT OVERLOAD AND GROUP OVERLOAD PROTECTION CIRCUIT OF POWER SUPPLY

BACKGROUND OF THE INVENTION

1. Field of the Invention

The present invention relates to a power supply capable of selecting an independent overload protection circuit or a group overload protection circuit for a plurality of loads that require a large electric power output, such that users can select the appropriate electric power output according to the capacity requirement of the loads.

2. Description of the Related Art

Science and technologies advance rapidly, and electronic technology is well developed. Computer systems become increasingly more powerful as the functions of central processing units (CPU) and graphic cards are enhanced. With a variety of other additional functions, the functions of component modules that constitute the basic architecture of a computer become more powerful accordingly and maximize the utility of the whole system. For instance, the specifications of central processing units are improved from single-core to dual-core architecture, and the graphic cards are upgraded to the high-resolution 3D effect for high-level computer players, and some computer systems even employ more than two or three graphic cards.

At present, a high-end graphic card requires an electric power of 150 watts, and a set of computer system consumes an electric power of 300~450 watts for its graphic cards, and thus the past power supply of 300~350 watts no longer can meet the requirement now. Furthermore, the quantity of other hard disk drives, optical disk drives and USB connectors increases and each device requires a lower voltage (in volts) and a higher electric power (in watts), so that the system can maximize its utility, and the design of power supply tends to be high power.

Since it is necessary to take the user's safety into consideration for the design of the power supply, the SSI and UL specifications sets a critical value for the maximum output power of a single load. For example, the SSI 1 specification sets the critical value to 240 VA, which means that a current has an upper limit of 20 amperes (A) when the output voltage is 12 volts (V). The upper limit of the current is set to 20 amperes (A) for protecting the safety of computer users. However, a professional user generally connects many peripherals to the computer system, and thus a higher electric power is required. To meet this requirement, power supply manufacturers generally design and develop a power supply system with high power. As a result, a higher development cost is incurred. Furthermore, the power supplies come with various different specifications, and thus both manufacturing and carrying costs are increased as well.

In view of the foregoing shortcomings of the prior art, some designers proposed a power supply that allows users to select or increase the output power, and such power supply combines a plurality of power supplies to increase the total output power. For example, the original output current of a load is 20 A, and a select circuit is provided for users to set the output load to 30 A or above. Although this method can increase the output power of the load, the protection circuit is triggered to disconnect the power when the output power of a load is higher than the maximum allowed output power such as an output over 30 A, and the current requirement of other loads is lower than 20 A, and the sum of two output power is smaller than 50 A, and thus this method is very inconvenient and not suitable for practical applications.

SUMMARY OF THE INVENTION

In view of the foregoing shortcomings of the prior art, the inventor of the present invention based on years of experience in the related industry to conduct extensive researches and experiments, and finally developed a selective independent overload or group overload protection circuit of a power supply in accordance with the present invention to provide a feasible solution and overcome the foregoing shortcomings of the prior art.

The primary objective of the present invention is to provide a plurality of circuits having a larger power output, so that users can select whether or not to turn on a group overload protection circuit according to the electric power requirement of a load.

The secondary objective of the present invention is to provide a power protection circuit and allow developers and manufacturers to design a power supply that does not require redesigning or developing a certain independent load with a larger requirement.

Another objective of the present invention is to provide users a way of switching to a group circuit when the output power requirement of a certain independent load increases, but the total output power of all loads in the group circuit has not reached the critical value, so as to maintain a normal operation of the power supply without disconnecting the power.

DETAILED DESCRIPTION OF THE PREFERRED EMBODIMENTS

Figure 1:
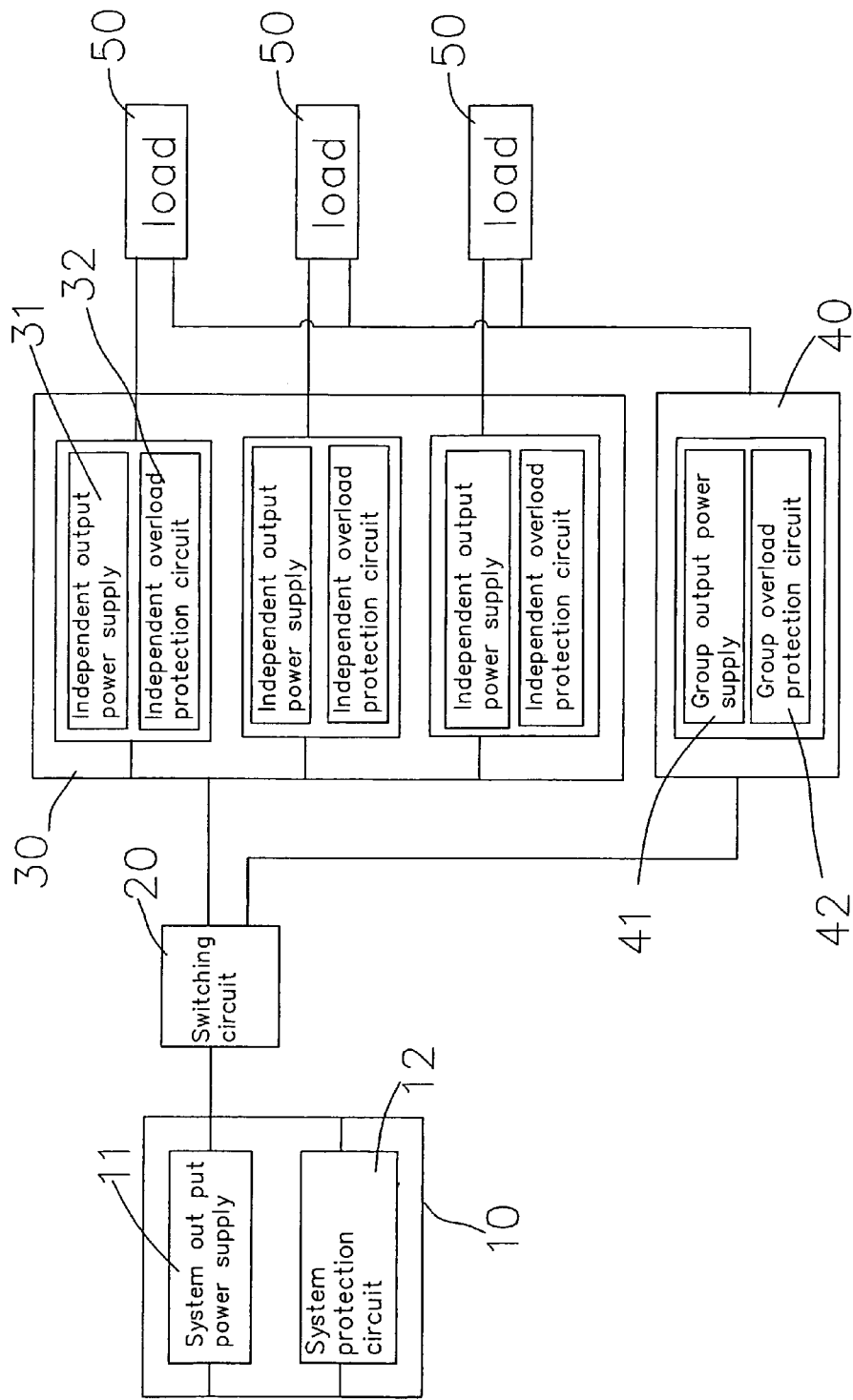
FIG. 1 is a schematic circuit diagram of the present invention.

To make it easier for our examiner to understand the present invention, the following detailed description with reference to the accompanying drawing of a preferred embodiment is given for example, but such preferred embodiment is not intended to limit the scope of the present invention. For simplicity, like numerals are used for like elements for the description of the specification of the present invention.

Referring to FIG. 1 for a schematic circuit diagram of a selective independent overload and group overload protection circuit of a power supply in accordance with the present invention, the power supply comprises a power conversion circuit 10, a switching circuit 20, a plurality of independent circuits 30 and a group circuit 40; wherein the power conversion circuit 10 converts an external power supply into several different voltage outputs (this preferred embodiment converts an external AC power of 110 volts or 220 volts into a DC voltage of +3.3 volts, +5 volts or +12 volts), and the power conversion circuit 10 includes a system output power supply 11 (providing a plurality of larger DC voltages of +12 volts and smaller voltages of +3.3, +5 volts) and a system protection circuit 12. The system protection circuit sets the critical value of output power of the power supply according to the requirements of the SSI or UL specification. If the output of the power supply exceeds the critical value (Overload), a power-off signal or a warning signal will be issued according to a predetermined processing procedure (wherein the protection circuit of this embodiment is a prior art, and the present invention is not limited to such arrangement only, but any other equivalent circuits are also covered in the scope of the invention, and the operation of related circuits will not be described here). A switching circuit 20 (which can be turned on manually by users or by an integrated circuit or another equivalent circuit) is connected to the system output power supply 11 and provided for users to select and drive a plurality of independent circuits 30 or a group circuit 40. A plurality of independent circuits 30 (which are three independent circuits adopted in this preferred embodiment) include a plurality of independent output power supplies 31 and an independent overload protection circuit 32 having a one-to-one correspondence with the independent output power supply 31. Further, the independent output power supply 31 is connected in a one-to-one correspondence with each load 50. A group circuit 40 includes a group output power supply 41 and a group overload protection circuit 42, and the group output power supply 41 is connected concurrently with each load 50, and the critical value of the group overload protection circuit 42 is not greater than the total output power of each independent overload protection circuit.

For the illustration of this invention, the voltage outputs of both independent circuit 30 and group circuit 40 adopted in this embodiment are equal to 12 volts.

In an application of the invention, the critical value of a single load output is specified according to the SSL or UL specification (particularly, the voltage of a single load output equals to 12 volts and the current is not greater than 20 amperes).

First Situation:

If the total power used by a user is not greater than the output critical value of the system output power supply 11 and the user selects an output power of a single load 50 not greater than 20 amperes and the output power of any load 50 connected to the independent circuit 30 is greater than 20 amperes, then the independent overload protection circuit 32 will be turned on, and the power disconnection or a warning signal will be issued.

Second Situation:

If the total power used by a user is not greater than the critical value of the system protection circuit 12 and the user selects a group circuit 40, and the output power of any load 50 connected to the group circuit 40 is greater than 20 amperes, but the total output power of the group circuit 40 is not greater than 20 amperes*3=60 amperes, then the group overload protection circuit 42 will not be turned on but will maintain a normal operation of the power supply. On the other hand, if the power output of the group circuit 40 is greater than 20 amperes*3=60 amperes, then the group overload protection circuit 42 will be turned on, and a power-off signal or a warning signal will be issued.

Third Situation:

If a user selects an independent circuit 30 or a group circuit 40, and the critical value is not exceeded, and the power output of the total load (including the loads connected to the voltages of 12 volts, 3.3 volts and 5 volts) connected to the power supply is greater than that of the system protection circuit 12, then the system protection circuit 12 will be turned on, and a power-off signal or a warning signal will be issued.

In summation of the description above, the selective independent overload and group overload protection circuit of a power supply in accordance with the present invention comes with a simple structure, provides a convenient way of use, enhances the prior art and also complies with the patent application requirements, and thus the invention is duly filed for the patent application.

The description and its accompanied drawings are used for describing a preferred embodiment of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A selective independent overload and group overload protection circuit of a power supply, comprising:
   a power conversion circuit, for converting an external power supply into a plurality of DC voltage outputs, and the power conversion circuit including a system output power supply and a system protection circuit;
   a switching circuit, coupled to the system output power supply;
   a plurality of independent circuits, selectively switched and coupled to the system output power supply by the switching circuit, and the independent circuit including a plurality of independent output power supplies and an independent overload protection circuit with a one-to-one correspondence with each independent output power supply, and the independent overload protection circuit having a critical value of power output;
   a group circuit, selectively switched and coupled to the system output power supply by the switching circuit, and the group circuit including a group output power supply and a group overload protection circuit, and the group overload protection circuit has a critical value of power output not greater than the sum of the critical values of power output of the plurality of independent output power supplies; and
   a plurality of loads, coupled to an independent output power supply in the plurality of independent circuits with a one-to-one correspondence with the group output power supply of the group circuit;
   thereby, a user can turn on an independent circuit or a group circuit by the switching circuit for selecting an appropriate power output according to the requirement of a load.

2. The selective independent overload and group overload protection circuit of a power supply as recited in claim 1, wherein the system output power supply has an electric DC power selected from the collection of +3.3 volts, +5 volts and +12 volts.

3. The selective independent overload and group overload protection circuit of a power supply as recited in claim 1, wherein the independent output power supply of the independent circuit is equal to +12 volts.

4. The selective independent overload and group overload protection circuit of a power supply as recited in claim 1, wherein the system protection circuit issues a power-off signal or a warning signal according to a predetermined processing procedure, if the output power of a power supply exceeds the critical value of output power.

5. The selective independent overload and group overload protection circuit of a power supply as recited in claim 1, wherein the switching circuit is turned on by a manual circuit.

6. The selective independent overload and group overload protection circuit of a power supply as recited in claim 1, wherein the switching circuit is turned on by an integrated circuit.

* * * * *